United States Patent

Danielsson

[11] Patent Number: 5,517,887
[45] Date of Patent: May 21, 1996

[54] METHOD AND ARRANGEMENT FOR REMOVING LEADING AND TRAILING ENDS FROM RAPIDLY MOVING ROLLED MATERIAL

[75] Inventor: Kurt Danielsson, Smedjebacken, Sweden

[73] Assignee: Morgardshammar AB, Smedjebacken, Sweden

[21] Appl. No.: 190,182

[22] PCT Filed: Aug. 7, 1992

[86] PCT No.: PCT/SE92/00545

§ 371 Date: Apr. 18, 1994

§ 102(e) Date: Apr. 18, 1994

[87] PCT Pub. No.: WO93/02826

PCT Pub. Date: Feb. 18, 1993

[30] Foreign Application Priority Data

Aug. 8, 1991 [SE] Sweden ................... 9102316

[51] Int. Cl.$^6$ .................................. B65H 27/00
[52] U.S. Cl. .................. 83/27; 83/105; 83/156; 83/337; 83/950
[58] Field of Search ............... 83/105, 106, 102, 83/156, 950, 337, 27; 198/69, 65, 67

[56] References Cited

U.S. PATENT DOCUMENTS

| | | | |
|---|---|---|---|
| 370,688 | 9/1887 | Daniels | 83/106 |
| 2,155,578 | 4/1939 | Anderson | 83/156 |
| 3,489,043 | 1/1970 | Dent | 83/105 |
| 3,591,279 | 7/1971 | Gardner | 83/106 |
| 4,096,010 | 6/1978 | Parham et al. | 83/102 |
| 4,373,713 | 2/1983 | Loebach | 83/105 |
| 4,538,800 | 9/1985 | Richter | 83/106 |
| 4,729,282 | 3/1988 | Kasdorf | 83/105 |
| 4,919,027 | 4/1990 | Littleton | 83/107 |
| 4,977,806 | 12/1990 | Poloni . | |

FOREIGN PATENT DOCUMENTS

| | | |
|---|---|---|
| 0387236 | 9/1990 | European Pat. Off. . |
| 2706510 | 8/1977 | Germany . |
| 2720136 | 11/1978 | Germany . |
| 2830253 | 8/1980 | Germany . |
| 59-57863 | 4/1984 | Japan . |
| 435143 | 9/1984 | Sweden . |

*Primary Examiner*—Kenneth E. Peterson
*Attorney, Agent, or Firm*—Young & Thompson

[57] ABSTRACT

An arrangement for removing an end-part from rapidly moving rolled material includes a cutting device (3) which functions to cut the moving rolled material, and a guide (4) which is located downstream of the cutting device. The guide has an active state, in which a forward end of rolled material (T) to be fed to the guide (4) in a first direction, is gripped and driven thereby and discharged therefrom in a second direction different from the first direction, and an inactive state, in which an end-part of rolled material (T) incoming in the first direction passes through the guide (4) without changing direction and without being gripped thereby. The arrangement also includes feed devices (5) which function to advance rolled material (T) in the second direction. This rolled material is discharged from the guide (4) in the second direction with the guide in its active state.

7 Claims, 3 Drawing Sheets

METHOD AND ARRANGEMENT FOR REMOVING LEADING AND TRAILING ENDS FROM RAPIDLY MOVING ROLLED MATERIAL

FIELD OF THE INVENTION

The present invention relates to a method and to an arrangement for removing an end-part from rapidly moving rolled material, particularly from rolled wire-rod of small diameter. The invention also relates to guide means included in such arrangement.

BACKGROUND OF THE INVENTION

When hot rolling wire-rod, the leading and trailing parts of the rod will have dimension errors and metallurgical faults as a result of uneven cooling. The end-parts of the rod are therefore cut-off and removed from the roller line. This is carried out manually at present and the work involved is manually exacting and must be carried out in a hot and demanding environment and is therefore also physically strenuous.

Several constructions have been proposed for automatically severing and removing the end-parts of hot rolled wire-rod, although none of these constructions have been found to function satisfactorily in practice. The basic problem is one of providing a construction which is able to move a severed part of the wire-rod away from the rolling line positively and with satisfactory reliability in operation.

SUMMARY OF THE INVENTION

The invention relates precisely to such a method and an arrangement for separating defective end-parts automatically from rapidly moving rolled material such that the end-parts will be severed and removed from the rolling line positively and reliably without disturbing production and transportation of the remaining fault-free rolled material rapidly moving through the rolling line.

This object is achieved with an arrangement of the kind defined in the introduction which is characterized in that the arrangement includes a cutting device or end-shears which functions to cut the moving rolled material, a guide means which is located downstream of the end-shears and which has an active state in which a leading end of rolled material fed to the guide means in a first direction is gripped and driven by said guide means and discharged therefrom in a second direction different to the first direction, and an inactive state in which an end of a rolled material entering the guide means in the first direction passes through said guide means without changing direction and without being gripped by said means; and in that said arrangement further includes feed devices which function to feed in said second direction rolled material discharged from the guide means in said second direction in the active state of said guide means.

According to one preferred embodiment, the guide means includes a first rotatable roller whose peripheral surface engages tangentially one side of rolled material moving in the first direction, and a second rotatable roller which is mounted on the opposite side of the rolled material to the first roller and is displaced relative thereto in the downstream direction, wherein the second roller can be moved in said direction towards and away from the first roller between a first, active position in which the smallest distance between the peripheral surfaces of the first and the second roller is smaller than or equal to the diameter of the rolled material which is to pass through the guide means, and a second, inactive position, in which the peripheral surface of the second roller engages tangentially that side of rolled material moving in the first direction which is opposite to that engaged by the first roller, and wherein the rollers are driven rotationally at the same peripheral speeds.

According to a preferred variant of this embodiment, the guide means also includes a third rotationally driven roller which is mounted downstream of and adjacent to the first roller on the same side of the rolled material passing through the guide means in the first direction as the first roller, wherein the peripheral surface of the third roller engages tangentially this side of the rolled material and is positioned relative to the second roller so that in its active position, the smallest distance between the peripheral surfaces of the second and the third roller will be equal to the smallest distance between the peripheral surfaces of the second and the first roller, and wherein the third roller is driven at the same peripheral speed as the first and the second rollers.

The invention also relates to a method of removing a forward end-part from rapidly moving rolled material, characterized by the steps of: bringing to an active state a guide means having an active state in which a forward end of rolled material which is fed into the guide means in a first direction is gripped and driven by said guide means and discharged therefrom in a second direction different from the first direction, and an inactive state in which an end of rolled material entering the guide means in said first direction passes through said guide means without changing direction and without being gripped by said guide means; feeding the rolled material moving in said first direction into said guide means; feeding the forward end of the rolled material exiting from the guide means in a second direction into feed devices which function to advance said rolled material in said second direction; causing said guide means to take its inactive state subsequent to the feed devices having gripped the rolled material; and severing the rolled material when the terminal end of the forward end-part of said rolled material has reached the position of a cutting device or end-shears located upstream of the guide means, wherein the severed forward end-part of the rolled material leaves the guide means while moving in said second direction, whereas the forward end of the remaining part of the rolled material passes through said guide means without changing direction.

The invention also relates to a method of removing a trailing or rearward end-part from rolled material which moves rapidly in a first direction, said method being characterized by the following steps; switching a guide means through which the rolled material moves from a state, in which a forward end of a rolled material is able to pass through the guide means without changing direction, to an active state in which the rolled material is gripped and driven by said guide means and discharged therefrom in a second direction different from the infeed direction; and by severing the rolled material with the aid of a cutting device or end-shears located upstream of the guide means, when the forward end of said end-part reaches said end-shears.

BRIEF DESCRIPTION OF THE DRAWINGS

A preferred exemplifying embodiment of the invention will now be described in more detail with reference to the accompanying drawings, in which.

DETAILED DESCRIPTION OF THE INVENTION

Figure 1:
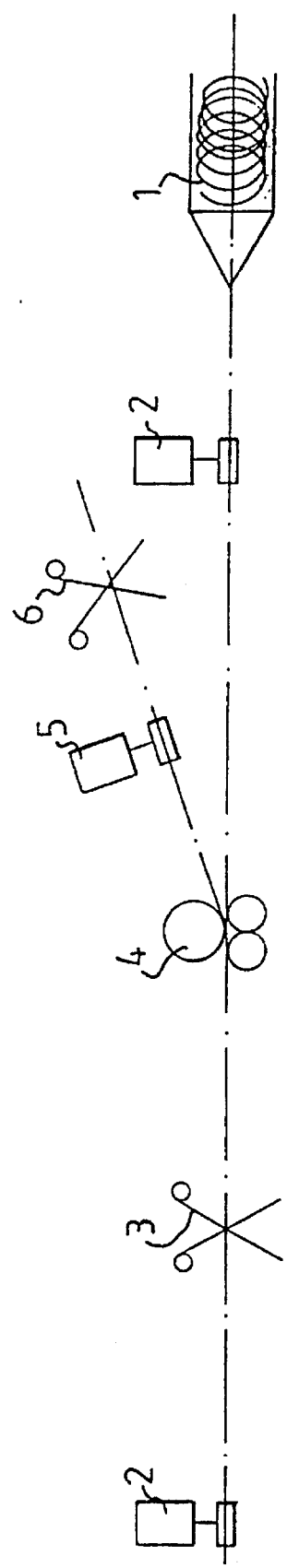
FIG. 1 illustrates schematically an arrangement constructed in accordance with the invention.

The arrangement illustrated schematically in FIG. 1 and intended for removing an end-part from a rapidly moving rolled material is positioned in the rolling line of a rod mill between a water-cooling section (not shown) in which the rolled material, here assembled to be a wire-rod, is cooled subsequent to leaving the wire-rod block, and a wire-rod laying-out device 1 provided with a cooling conveyor. The reference numeral 2 identifies conventional feed devices which function to feed wire-rod from the block to the laying-out device.

The actual arrangement for removing an end-part from rapidly moving wire-rod includes a cutting device or end-shears 3 mounted upstream of a guide means 4. The guide means 4 functions to guide an incoming end of the wire-rod in a manner which causes said end to leave the guide means in one of two specific directions, of which the first direction coincides with the direction of the rolling line. The arrangement also includes feed devices 5 which function to feed wire-rod leaving the guide means in said second specific direction to means for handling the wire-rod fed from the feed devices, said handling means having the form of hacking scissors 6 in the illustrated case.

Figure 4B:
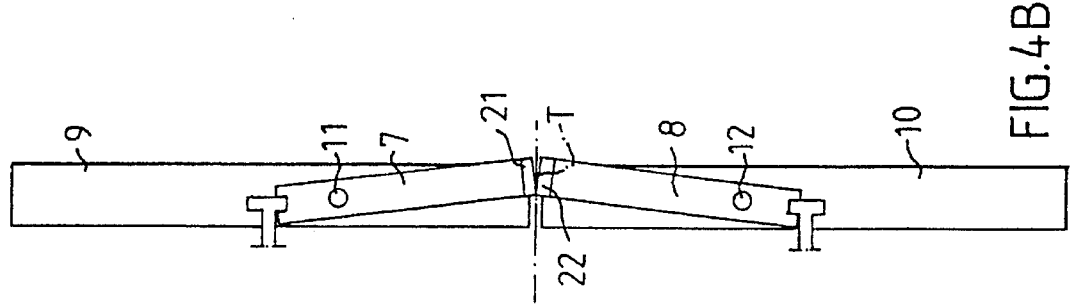
FIGS. 4A, B illustrate schematically a preferred embodiment of the end-shears included in the arrangement illustrated in FIG. 1, in accordance with the invention.
Figure 4A:
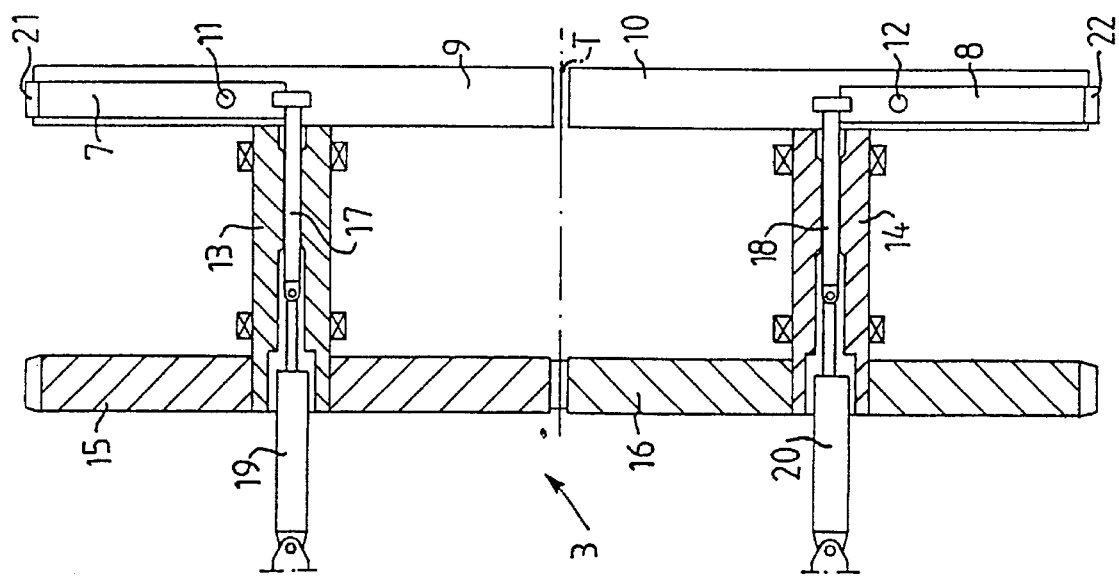

The end-shears 3 illustrated in FIGS. 4A and 4B include two arms 7, 8 which are pivotally journalled on support arms 9 and 10 respectively by means of respective pivot pins 11 and 12. The support arms 9, 10 are fixedly connected to respective rotatable shafts 13 and 14 which are attached to respective drive wheels 15 and 16. The drive wheels 15, 16 have outer teeth which mesh with one another such that when one of said drive wheels is driven, the drive wheels 15, 16 will rotate and the support arms 9, 10 connected thereto and the arms 7, 8 synchronously with one another in opposite directions. The drive wheels 15, 16 can be driven in any suitable manner, for instance by means of an outer toothed wheel whose teeth mesh with the teeth of one of said drive wheels.

The shafts 13, 14 are hollow and a respective pull-rod 17, 18 extends through a respective shafts 13, 14. Each of the pull-rods has provided at one end thereof a circular bead which engages a groove provided on the end of respective arms 7, 8. The other end of a respective rod 17, 18 is pivotally connected to the piston rod of a respective double-acting piston-cylinder device or jack 19, 20. These jacks are operated synchronously so that the free ends of the arms 7, 8 will swing outwards simultaneously, when the arms swing around their respective pivot pins 11, 12, by virtue of the fact that, due to the action of the jacks, the opposite ends of the arms 7, 8 are simultaneously drawn inwards. In FIG. 4A, which illustrates the end-shears 3 in a partly cut-away view from one side, the piston rods of the jacks 19, 20 are shown in a fully extended position. FIG. 4B is a view which illustrates the support arms and arms from the opposite side to that shown in FIG. 4A, and shows the piston rods of the jacks 19, 20 during the withdrawal of said piston rods and outward swinging of the arms 7, 8. FIG. 4B also shows the support arms rotated through one-half of a revolution in relation to their positions shown in FIG. 4A.

The free ends of the arms 7, 8 carry a respective shearing steel 21, 22.

The end-shears 3 are so arranged in relation to the rolling line that a wire-rod T will lie on one side of the centre line of the support arms 9, 10 which rotate in a plane parallel to the rolling line at a speed such that their peripheral speed will coincide with the speed at which the wire-rod is moving. In the position illustrated in FIG. 4A, with the piston rods of the jacks 19, 20 fully extended, the arms 7, 8 and the shearing steels 21, 22 carried thereby will rotate without coming into contact with the wire-rod T. The end-shears is also so positioned in relation to the wire-rod T that said rod is intersected by the movement path of the shearing steels 21, 22 during withdrawal of the piston rods of said jacks, when the arms 7, 8 are located in the rotational position in which the shearing steels are located in front of the wire-rod T, as illustrated in FIG. 4B.

The end-shears 3 operate in the following manner.

The drive wheels 15, 16 are rotated constantly at a rotational speed at which the shearing steels 21, 22 on the ends of respective arms 7, 8 have a peripheral speed which coincides with the speed at which the wire-rod moves, this speed exceeding 100 meters/second in many cases. When the wire-rod is to be cut, the jacks are activated so that the arms 7, 8, and therewith the shearing steels 21, 22, are swung outwards and shear the wire-rod T in a scissor-like fashion. The piston rods are then fully extended rapidly so that when the shearing steels are located opposite one another during the next revolution of their rotation, said steels will be located outside the movement path of the wire-rod T.

It will be understood that it is necessary to activate the jacks very rapidly, since the shearing steels are only located in front of the wire-rod T for a very short time, due to the high rotational speed of the shearing steels. Activation of the jacks is preferably effected in response to the output signal of a sensor which detects the angular position of one of the arms 7, 8. The jacks, and also the jack control means, may be operated electrically, pneumatically or hydraulically.

It will be understood that the end-shears illustrated in FIGS. 4A, B can be modified in many ways within the scope of the present invention. For example, the lengths of the support arms and the positions of the pivot pins may be different to that shown. It is preferred, however, to position the pivot pins relatively close to the ends of the arms, so that the working stroke of the jacks is short in relation to the rotational movement of the shearing steels, therewith maintaining the shortest possible jack-activation time. Furthermore, the pull-rods may be connected to the arms in a manner different to that illustrated in FIGS. 4A, B, and may engage the arms 7, 8 at locations other than the ends of said arms. However, positioning of the jacks in a rotational centre simplifies construction.

Figure 2:
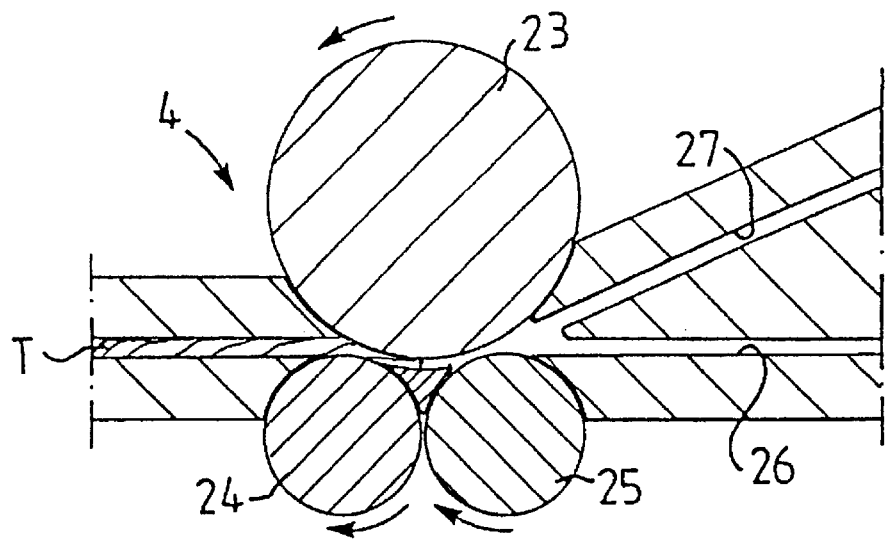
FIG. 2 illustrates schematically a preferred embodiment of an inventive guide means forming part of the arrangement in FIG. 1, said guide means being shown in its active state.
Figure 3:
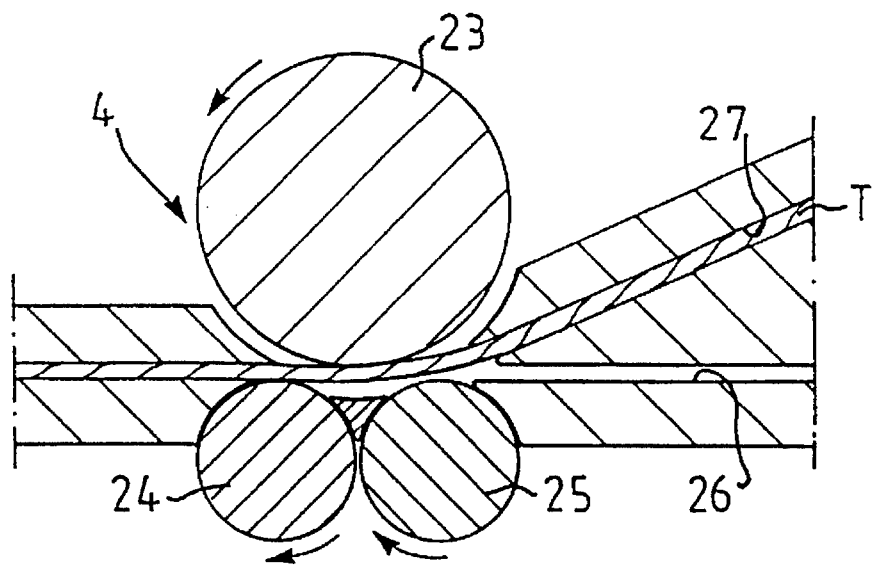
FIG. 3 illustrates the guide means shown in FIG. 2 in its inactive state.

FIGS. 2 and 3 are schematic sectional views of a guide means 4 constructed in accordance with the invention.

The main components of the guide means are three driven rollers 23, 24, 25. The rollers 24 and 25 have mutually the same diameter and are disposed side-by-side and are positioned in relation to the rolling line such that the peripheral surfaces of said rollers will engage the same side of a wire-rod which passes the rollers in the direction of the rolling line. The roller 23 is mounted on the opposite side of the roller line to the rollers 24, 25, opposite said rollers. The roller 23 can also be moved towards and away from the rollers 24 and 25, between a first active position, in which the roller gaps or nips, i.e. the smallest distance between the peripheral surfaces of rollers 23 and 24, 25 respectively is equal to or somewhat smaller than the diameter of a wire-rod T moving in the direction of the rolling line, and a second, inactive position, in which the peripheral surface of the roller 23 engages tangentially the opposite side of a wire-rod T moving in the direction of the rolling line to that engaged by the rollers 24, 25. In the illustrated exemplifying embodiment, the diameter of the roller 23 is twice that of the rollers 24 and 25. The rollers 23, 24 and 25 are driven for rotation in the directions indicated by the arrows in FIGS. 2 and 3, such that the rollers will rotate at peripheral speeds which coincide with the speed at which the wire-rod T moves through the wire-rod mill.

FIG. 2 illustrates the guide means 4 in its active state, with a wire-rod T arriving at the guide means from the wire-rod block. The forward or leading end of the wire-rod T has just been gripped by the rollers 23 and 24 and the rod is driven by said rollers through the gap therebetween. The wire-rod leaves the peripheral gap in a tangential direction, i.e. in a direction different to the direction of the rolling line. The wire-rod is then fed to the roller 25 and the peripheral gap or nip between this roller and the roller 23, in which the forward end of the wire-rod is again gripped. The forward end of the wire-rod T then leaves the peripheral gap between the rollers 23 and 24 in the direction of the tangent to this peripheral gap and thus in a direction which deviates from the direction of the rolling line.

As shown in FIGS. 2 and 3, wire-rod guide channels are arranged in the direction of the rolling line and in the outfeed direction of the guide means when said guide means is in its active state, these guide channels being referenced 26 and 27 respectively.

As illustrated in FIG. 1, the guide channel 27 guides the wire-rod to the feed devices 5.

The arrangement operates in the following manner.

When the wire-rod mill is started-up, the end-shears 3 are adjusted so that the shearing steels will rotate on one side of the rolling line (see FIG. 4A) and the guide means 4 is brought to its active state (see FIG. 2).

The forward end of the first rolled end-part of the wire-rod T encumbered with dimensioned errors and metallurgical faults due to uneven cooling, is then guided by the guide means 4 into the guide channel 27. When this forward end of the wire-rod has passed the feed devices 5 arranged in the extension of the guide channel 27, the guide means 4 is brought to its inactive state, by moving the roller 23 away from the rollers 24 and 25. The guide means 4 then no longer drives the wire-rod T, and driving of the wire-rod in the direction of the guide channel 27 is effected totally by the feed devices 5. These feed devices are driven at a slightly greater speed than the speed at which the wire-rod T travels in the rolling line, and thus the feed devices will strive to increase the wire-rod travelling speed and to pull said wire-rod up against the roller 23, as illustrated in FIG. 3.

When the end of the forward end-part of the rolled wire-rod T reaches the end-shears 3, said end-shears are activated by the jacks 19, 20, so as to sever said end; the end-part may well have a length of from 35–40 meters while the length of the wire-rod to be rolled may well have a length of about 10,000 meters. Because the feed devices 5 are driven at a greater speed than the speed at which the wire-rod travels in the rolling line, the terminal end of the sheared end-part is removed positively from the forward end of the remainder of the rolled wire-rod. Immediately after said end-part has been sheared, the piston rods of the jacks 19, 20 are returned to their fully extended position, in which the shearing steels 21, 22 rotate to one side of the rolling line.

Due to the large gap between the roller 23 and respective rollers 24 and 25, the forward end of the remainder of the sheared wire-rod T is able to pass through the guide means 4 without being gripped thereby, and the rollers will then function as guide rollers which ensure that the wire-rod passing therethrough will not deviate from the direction in which it enters the guide means, i.e. the direction of the rolling line, and the remainder of the wire-rod T will leave the guide means in the same direction and move into the guide channel 26. The wire-rod then passes through a downstream feed device 2 and is layed-off by the laying-off device 1 for continued transportation on a cooling conveyor.

The forward, defective end-part of the rolled wire-rod T, which has been hacked to pieces of suitable size by the scissors 6 is delivered by said scissors to a suitable scrap-handling device.

The rear or trailing end-part of the rolled wire-rod T is also defective and shall be removed from the rolling line and delivered to the scrap-handling device. When the forward end of this trailing end-part of the wire-rod reaches the end-shears 3, the jacks are activated and the wire-rod is sheared. The guide means 4 is brought to its active state at the same time. As a result, the wire-rod located in the guide means is gripped in the peripheral gaps of the guide means and is fed-out tangentially from the peripheral gap, or nip, between the rollers 23 and 25. The wire-rod, however, is drawn by the feed device 2, located downstream of the guide means, into the guide channel 26 and the wire-rod therefore changes direction subsequent to exiting from the peripheral gap between the rollers 23 and 25. The terminal end of the faultless or error-free part of the rolled wire-rod therewith passes through the guide channel 26. The forward end of the severed end-part of said wire-rod, on the other hand, exits tangentially from the peripheral gap and is fed into the guide channel 27 and passes to the scrap-handling device, via the feed devices 5 and the hacking scissors 6.

As will be understood, it is necessary to be able to move the roller 23 very quickly, so that the guide means can be brought to its inactive state reliably and positively before the terminal end of the forward end-part of the wire-rod T reaches the guide means. Preferably, the time taken to move the roller 23 will be about 0.1 second. The feature whereby the roller 23 acts as a guide roller when the guide means is in its inactive state, such as to hold the wire-rod T in the rolling line, enables movement of the roller 23 to be kept to the smallest possible value. Such guiding, however, is not absolutely necessary, and it lies within the scope of the invention for the roller 23 to be located a greater distance from the rollers 24, 25 than in the described embodiment, when the guide means is in its inactive state.

As before mentioned, the direction of wire-rod T driven through the guide means 4 in its active state changes when it passes the peripheral gap between the rollers 23 and 24. Consequently, the desired change in direction of the end of a wire-rod could be effected with the aid of these two rollers alone. The described arrangement of three rollers is preferred, however, since the wire-rod drive achieved by the guide means is more positive in this latter case.

Since the change in direction of the wire-rod is contingent on the position of the peripheral gap, it will be seen that the direction in which the wire-rod exits from the guide means can be varied by varying the dimensions of the roller 23 or by varying the distance at which the rollers 24 and 25 are spaced apart. The former alternative is the one preferred, since guiding of the wire-rod through the guide means in its inactive state becomes more effective with smaller distances between the rollers 24 and 25. Furthermore, it will be understood that the rollers 24 and 25 need not have mutually the same dimensions. However, these rollers may be positioned so that their peripheral surfaces simultaneously touch one another and the peripheral surface of wire-rod moving in the direction of the rolling line when said rollers have mutually the same diameter, and hence this embodiment is also preferred.

Although the invention has been described with reference to a wire-rod mill, it will be understood that the invention can be applied with rolled materials other than wire-rod, provided that a different end-shears construction is used. Because the wire-rod is driven by the guide means in its active state, it is ensured that the wire-rod will be discharged from the guide means in a specific, determined direction, and because the guide means, when in its inactive state, functions to guide the wire-rod in its direction of travel, it is ensured that the end-parts of a rolled wire-rod will be removed reliably in operation while, at the same time, also ensuring that the devices operative in such removal will not disturb normal mill operation.

I claim:

1. A method of removing a forward end-part from a rapidly moving rolled material, comprising the following steps:

bringing to an active state a guide means (4) in which a forward end of rolled material (T) which is fed to the guide means (4) in a first direction is gripped and driven by said guide means and discharged therefrom in a second direction different from the first direction, and an inactive state in which an end of rolled material (T) entering said guide means in said first direction passes through said guide means (4) without changing direction and without being gripped thereby;

feeding the rolled material (T) moving in said first direction into the guide means (4);

feeding the forward end of the rolled material (T) exiting from the guide means (4) in said second direction into feed devices (5), which function to advance the rolled material (T) in said second direction;

causing the guide means (4) to take its inactive state when the rolled material (T) has been gripped by the feed devices (5); and cutting the rolled material when the terminal end of the forward end-part of the rolled material (T) reaches a cutting device (3) located upstream of the guide means (4), wherein the cut forward end-part of the rolled material (T) leaves the guide means (4) while moving in said second direction, whereas the forward end of the remaining part of the rolled material (T) passes through the guide means (4) without changing direction.

2. A method according to claim 1, wherein the feed devices (5) drive the rolled material (10) at a speed greater than the speed at which said rolled material arrives at the guide means (4).

3. An arrangement for removing an end-part from a rapidly moving rolled material having a diameter, comprising a cutting device (3) for cutting the moving rolled material, guide means (4) located downstream of the cutting device and having an active state, in which a forward end of rolled material (T) fed to the guide means (4) in a first direction, is gripped and driven by said guide means and fed therefrom in a second direction different to said first direction, and an inactive state in which an end of a rolled material (T) entering the guide means in said first direction passes through the guide means (4) without changing direction and without being gripped thereby, said arrangement further including feed devices (5) for advancing in said second direction rolled material (3) discharged in said second direction from the guide means (4) in its active state, said guide means including a first rotatable roller (24), whose peripheral surface enagages one side of rolled material (T) moving in said first direction, and a second rotatable roller (23), which is mounted on an opposite side of the rolled material (T) to the first roller (24) and is displaced relative thereto in the downstream direction; said second roller (23) being movable in a direction towards and away from the first roller (24), between a first, active position in which the smallest distance between the peripheral surfaces of the first and the second rollers (24 and 23) is smaller than or equal to the diameter of the rolled material (T) which shall pass through the guide means (4), and a second, inactive position in which the peripheral surface of the second roller (23) engages tangentially the opposite side of rolled material (T) moving in said first direction; and said first and second rollers (23, 24) being driven for rotation at mutually the same peripheral speeds.

4. An arrangement according to claim 3, wherein the cutting device (3) includes two arms (7, 8) which rotate about rotary axles (13, 14) in mutually opposite directions and which carry on respective one ends thereof shearing steel (21, 22), which in a given angular position of the arms during one revolution are located in front of one another, and means (19, 20) for swinging said arms in said given angular position out of a plane perpendicular to the rotary axle (13, 14), so as to cause the shearing steels (21, 22) to perform a scissor-like shearing movement in said plane.

5. An arrangement according to claim 4, wherein each of the arms (7, 8) is pivotally mounted on a respective support arm (9, 10), which are firmly connected to a respective corresponding rotary axle (13, 14).

6. An arrangement according to claim 4, wherein the means (19, 20) for swinging the arms (7, 8) from a plane perpendicular to the rotary axles comprise a hydraulic, pneumatic or electric jack.

7. An arrangement according to claim 3, wherein the guide means (4) further include a third rotatable, driven roller (25) which is mounted downstream of an adjacent to the first roller (24) on the same side of rolled material (T) passing through the guide means (4) in said first direction as the first roller (24) and with the peripheral surface of said third roller engaging said side; said third roller (25) being positioned relative to the second roller (23) such that, in its active state, the smallest distance between the peripheral surfaces of the second and the third roller (23 and 25) is equal to the smallest distance between the peripheral surfaces of the second and the first roller (23 and 24); and that the third roller (25) is driven at the same peripheral speed as the remaining two rollers.

* * * * *